(12) United States Patent
Zhao

(10) Patent No.: US 7,327,566 B2
(45) Date of Patent: Feb. 5, 2008

(54) COVER MECHANISM FOR DATA STORAGE DEVICE

(75) Inventor: Hui-Min Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,472

(22) Filed: Aug. 11, 2006

(65) Prior Publication Data

US 2007/0075612 A1   Apr. 5, 2007

(30) Foreign Application Priority Data

Aug. 12, 2005   (CN) .................. 2005 2 0063112

(51) Int. Cl.
*G06F 1/16*   (2006.01)
(52) U.S. Cl. .................. 361/685; 345/169; 235/451
(58) Field of Classification Search ............... 369/292; 711/114, 165; 345/169; 235/451, 381; 361/679–687, 361/724–727
See application file for complete search history.

(56) References Cited

U.S. PATENT DOCUMENTS

2004/0213141 A1* 10/2004 Lin ........................... 369/292
2006/0245159 A1* 11/2006 Lin et al. .................... 361/685
2007/0011425 A1* 1/2007 Sicola ........................ 711/165
2007/0153470 A1* 7/2007 Chen et al. ................. 361/685

FOREIGN PATENT DOCUMENTS

CN          98220678        10/1999

* cited by examiner

*Primary Examiner*—Hung Van Duong
(74) *Attorney, Agent, or Firm*—Wei Te Chung

(57) ABSTRACT

A cover mechanism for protecting a data storage device with a tray installed in an electronic device, includes a bezel defining an opening for the tray passing therethrough, a first cover movably connected to the bezel, an elastic member mounted between one of the first and second covers and the bezel, and a second cover movably connected to the bezel. The first cover comprises a first body covering one part of the opening of the bezel. The second cover comprises a body covering the other part of the opening of the bezel. Wherein the first cover and the second cover is capable of cooperating to move away from each other when the tray of the data storage device extends out of the opening, and moving toward each other via rebounding of the elastic member for covering the opening of the bezel.

20 Claims, 8 Drawing Sheets

COVER MECHANISM FOR DATA STORAGE DEVICE

DESCRIPTION

1. Field of the Invention

The present invention relates to cover mechanisms, and particularly to a cover mechanism that protects data storage devices from contamination and humidity.

2. Description of Related Art

Data storage devices, such as optical disk drives, are installed in a computer enclosure for communication and processing data. An optical disk drive includes a case and a tray received in the case. The tray can accommodate an optical disk therein, and read data from the optical disk. A front bezel is positioned in front of the optical disk drive. An opening is defined in the front bezel. The tray can be moved into or out of the case through the opening of the front bezel.

For example, typical personal computers include an enclosure for protection of internal devices, such as hard disk drives, compact disk read-only memory (CD-ROM) drives, motherboards, and the like. To access one of the internal devices such as the CD-ROM drive, an opening is defined in the enclosure. However, contamination and humidity may damage the personal computers via the openings.

To address the aforementioned problem, an enclosure having a protective cover as described in China Patent No. 98220678.X is invented. The enclosure includes a front panel defining an opening, and a cover is pivotably attached to the front panel via pivots for shielding the opening. However, the cover includes a protruding part that extends out of a front bezel whether the cover is open or closed so that the cover is prone to be damaged in transportation of the enclosure or in use due to accidental impact. This leads to a short life and an unpleasant appearance of the cover.

What is needed is to provide a cover mechanism protecting data storage devices from accidental damage.

SUMMARY OF THE INVENTION

In one preferred embodiment, a cover mechanism for protecting a data storage device with a tray installed in an electronic device, includes a bezel defining an opening for the tray passing therethrough, a first cover movably connected to the bezel, an elastic member mounted between one of the first and second covers and the bezel, and a second cover movably connected to the bezel. The first cover comprises a first body covering one part of the opening of the bezel. The second cover comprises a body covering the other part of the opening of the bezel. Wherein the first cover and the second cover is capable of cooperating to move away from each other when the tray of the data storage device extends out of the opening, and moving toward each other via rebounding of the elastic member for covering the opening of the bezel.

Other advantages and novel features will become more apparent from the following detailed description of preferred embodiments when taken in conjunction with the accompanying drawings, in which:

DETAILED DESCRIPTION OF THE INVENTION

Figure 1:
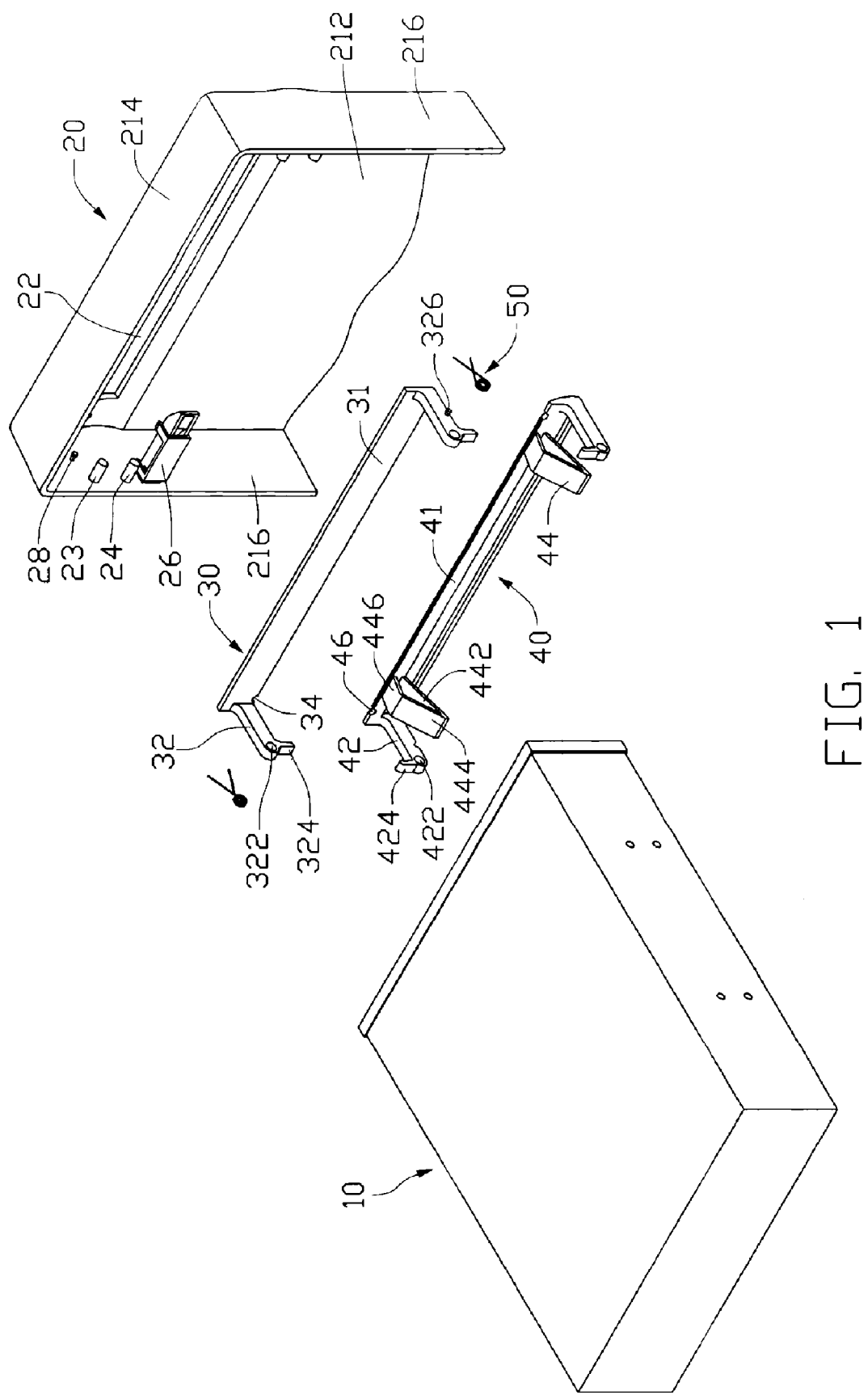
FIG. 1 is an exploded, isometric view of a cover mechanism in accordance with a first preferred embodiment of the present invention, together with a data storage device and part of a bezel.

Referring to FIG. 1, a cover mechanism of an electronic device in accordance with a first preferred embodiment of the present invention is adapted for protecting a functional part like a data storage device 10 installed in a case of the electronic device from accidental damage. In the first preferred embodiment, the data storage device 10 is an optical driver. The cover mechanism includes a bezel 20, a first cover 30 attached to the bezel 20, a second cover 40 attached to the bezel 20 in the vicinity of the first cover 30, and two elastic members 50 connected between the bezel 20 and the first cover 30. In the first preferred embodiment, the elastic members 50 are two torsion springs.

The bezel 20 includes a front panel 212, a top panel 214, and two side panels 216. An opening 22 for the data storage device 10 passing therethrough is defined in the front panel 212. A first rod 23 extends from an inner surface of each side panel 216. A second rod 24 extends from the inner surface of each of the side panels 216 under the corresponding first rod 23. The first rods 23 of the two side panels 216 are opposite to each other. The second rods 24 of the two side panels 216 are opposite to each other. A button assembly 26 for controlling a switch 14 (shown in FIG. 4) of the data storage device 10 is mounted to one of the side panels 216 of the bezel 20. Two locating posts 27 (shown in FIG. 2) protrude from an inner surface of the front panel 212 of the bezel 20 at opposite sides of the opening 22. A block 28 extends from the inner surface of each side panel 216 in the vicinity of a corresponding first rod 23.

The first cover 30 includes a first body 31 covering one part of the opening 22 of the bezel 20, and two first arms 32 protruding rearward from opposite ends of the first body 31. A first pivoting hole 322 is defined in a distal end of each first arm 32. A first engaging portion 324 extends down from the distal end of each first arm 32 and aligns with the corresponding first pivoting hole 322. A protrusion 326 protrudes out from each first arm 32. Two arc-shaped first cutouts 34 corresponding to the locating posts 27 of the bezel 20 are defined in a bottom of the first body 31 of the first cover 30. A shape edge 36 (shown in FIG. 4) protrudes down from the bottom of the first body 31 of the first cover 30.

The second cover 40 includes a second body 41 covering the other part of the opening 22 of the bezel 20, and two second arms 42 protrude rearward from opposite ends of the second body 41. The second body 41 of the second cover 40 has an arc-shaped outer surface. A second pivoting hole 422 is defined in a distal end of each second arm 42. A second engaging portion 424 extends up from the distal end of each second arm 42 and aligns with the corresponding second pivoting hole 422. Two arc-shaped second cutouts 46 corresponding to the locating posts 27 of the bezel 20 are defined in a top of the second body 41 of the second cover 40. Two stressed members 44 protrude rearward from the second body 41 of the second cover 40 adjacent opposite sides respectively. Each stressed member 44 includes a horizontal connecting part 442 protruding rearward from the second body 41, a first guiding portion 444 slantingly extending up and forward from a free end of the connecting part 442, and a second guiding portion 446 slantingly extending down and forward from a top end of the first guiding portion 444. An end of the second guiding portion 446 is connected to an inner surface of the second body 41 of the second cover 40. A slot 48 (shown in FIG. 5) is defined in a top of the second body 41 of the second cover 40.

Figure 2:
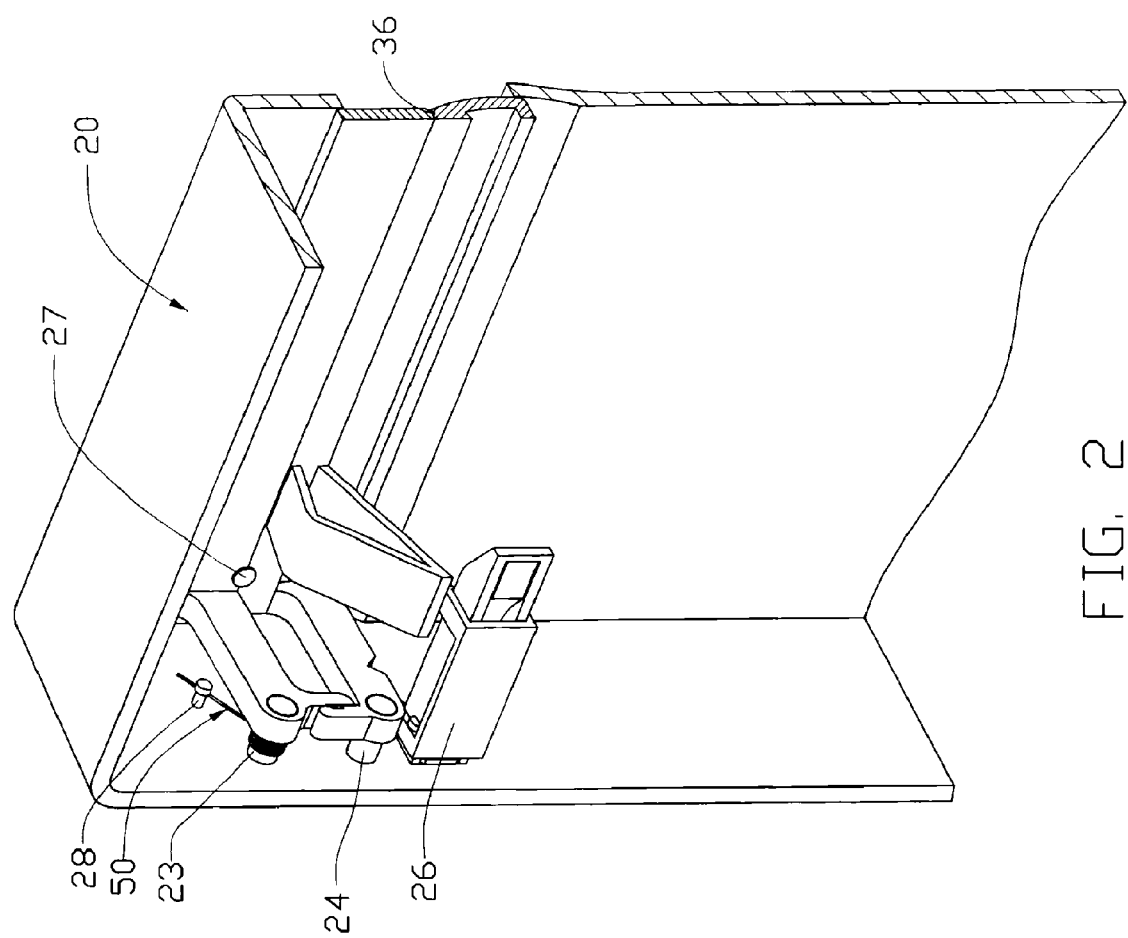
FIG. 2 is an assembled view of the cover mechanism of FIG. 1, but partially cutaway.

Referring to FIG. 2, in assembly, the elastic members 50 are placed around the corresponding first rods 23 respectively. The first cover 30 is pivotably connected to the bezel 20 by the pivoting holes 322 of the first arms 32 pivotably fitting about the corresponding first rods 23 of the bezel 20, respectively. The second cover 40 is pivotably connected to the bezel 20 by the pivoting holes 422 of the second arms 42 pivotably fitting about the corresponding second rods 24 of the bezel 20, respectively. Then one leg of each elastic member 50 is engaged with the corresponding block 28 of the bezel 20, and the other leg of each elastic member 50 is engaged with the corresponding protrusion 326 of the first cover 30.

Figure 3:
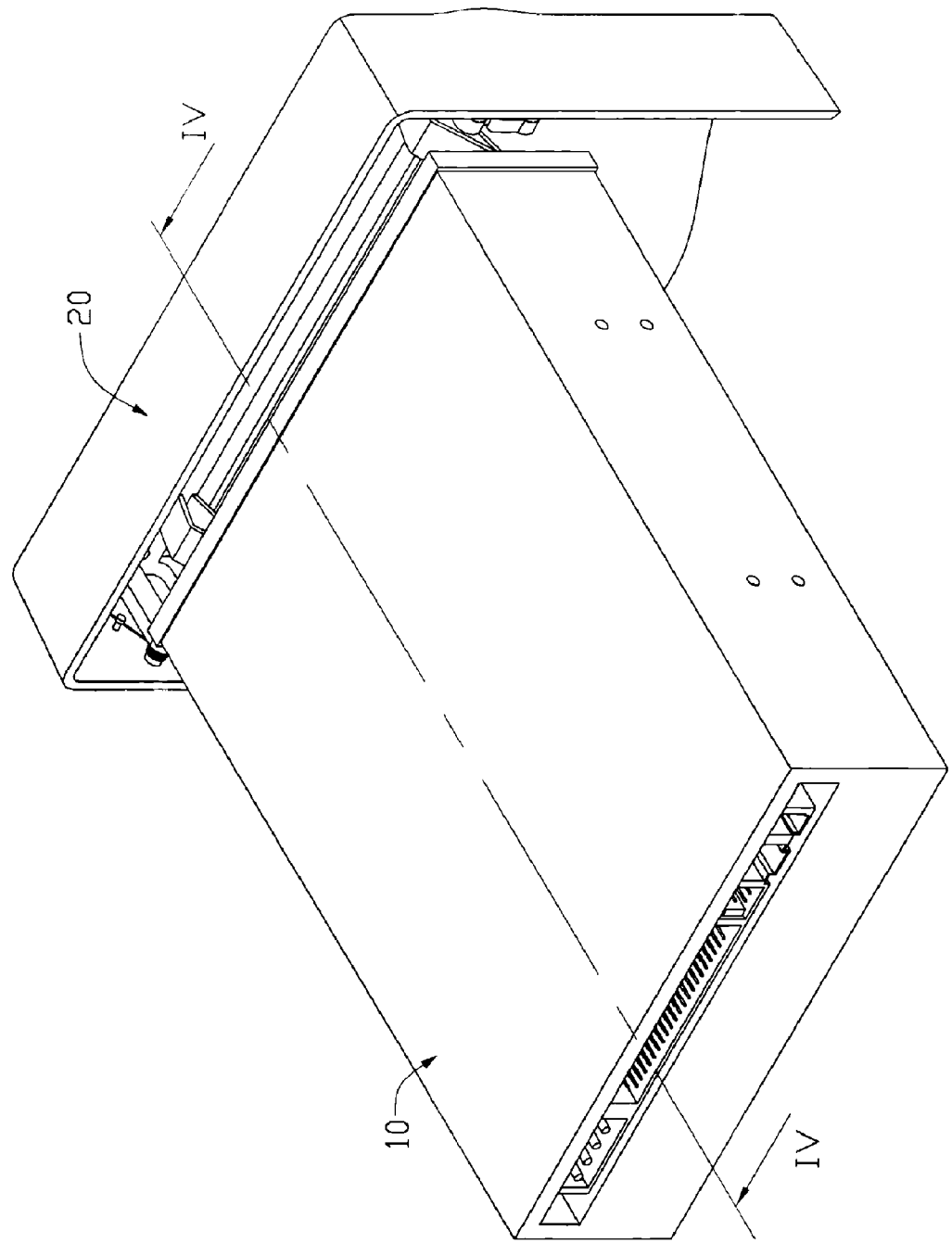
FIG. 3 is an assembled view of FIG. 1.
Figure 4:
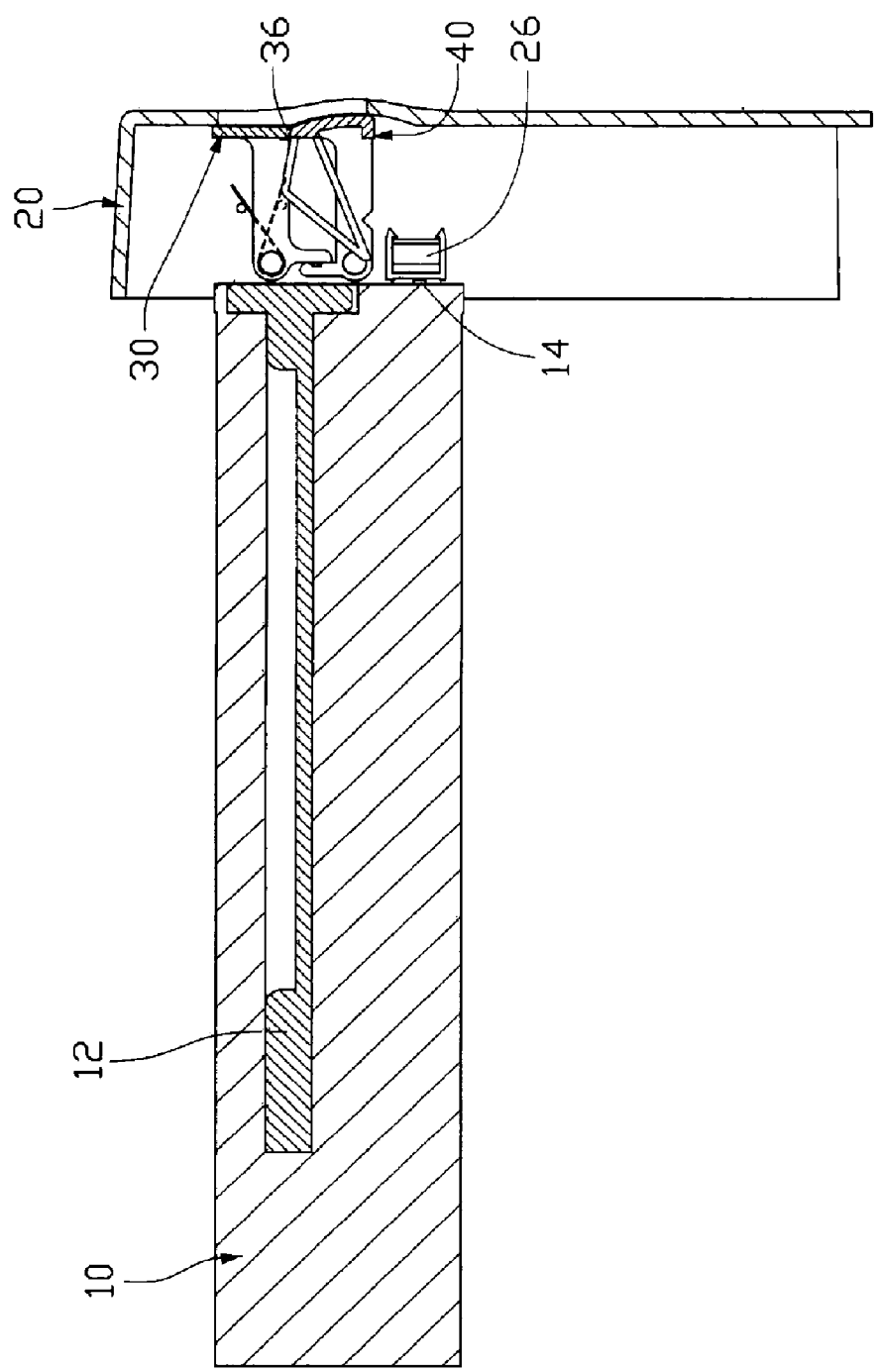
FIG. 4 is a cross-sectional view taken along line IV-IV of FIG. 3, showing a tray of the data storage device in a retracted state.

Referring also to FIGS. 3 and 4, when a tray 12 of the data storage device 10 is in a retracted state and does not extend out of the bezel 20, the bodies 31,41 of the first cover 30 and the second cover 40 cover the opening 22 of the bezel 20. The button assembly 26 is aligned with the switch 14 of the data storage device 10.

Figure 5:
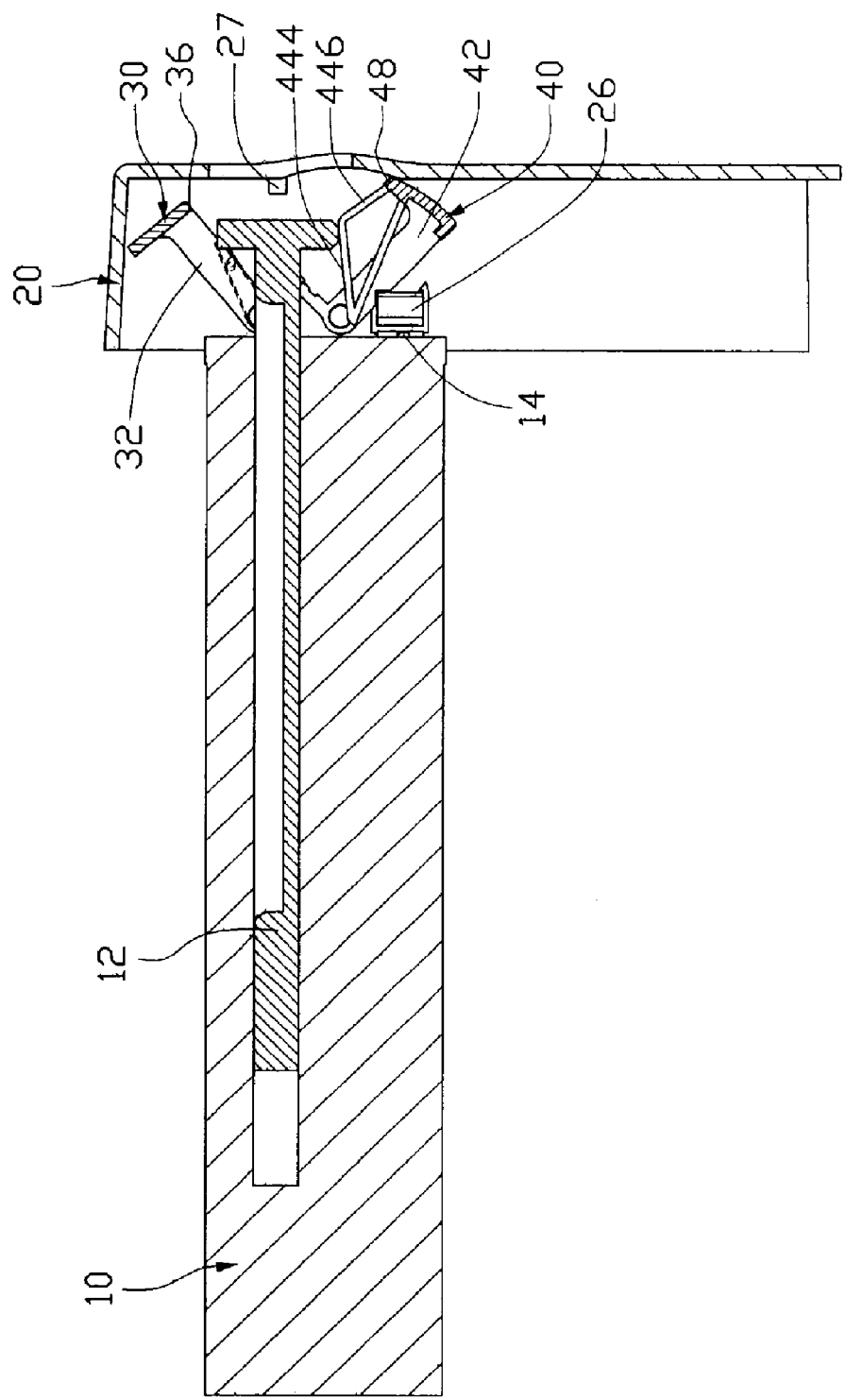
FIG. 5 is similar to FIG. 4, but showing the tray of the data storage device in a partially extended state.
Figure 6:
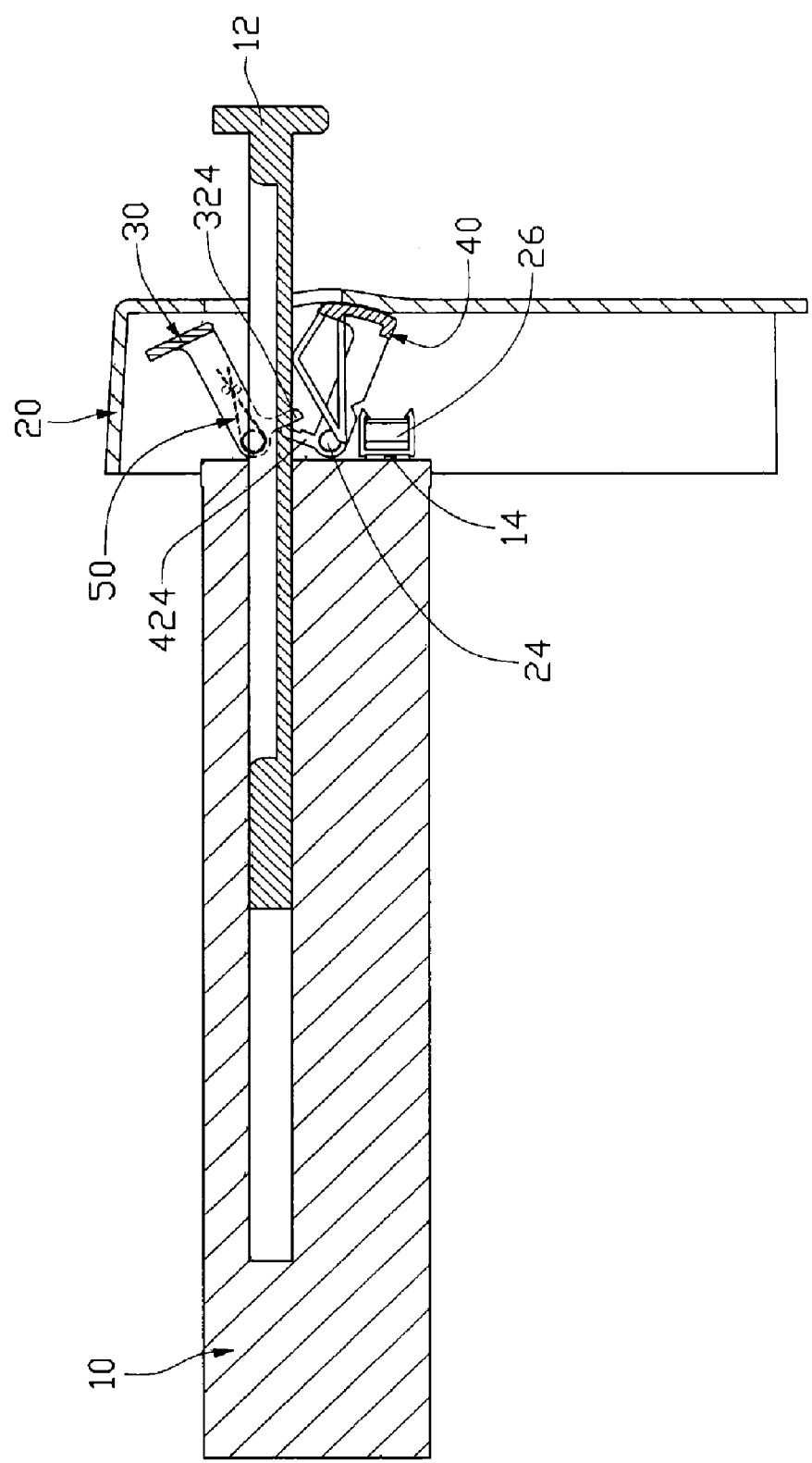
FIG. 6 is similar to FIG. 5, but showing the data storage device in an extended state.

Referring also to FIG. 5 and FIG. 6, to cause the tray 12 of the data storage device 10 to extend out of the bezel 10 to load or unload an optical disk, the button assembly 26 is pressed to trigger the switch 14 of the data storage device 10. The tray 12 then extends toward the opening 22 of the bezel 20. The tray 12 moves on the first guiding portion 444 of the stressed member 44 of the second cover 40 and drives the second cover 40 to pivot out and down around the second rods 24. The engaging portions 424 of the second cover 40 cooperate with the corresponding engaging portions 324 of the first cover 30 to drive the first cover 30 to pivot out and up around the first rods 23. The elastic members 50 are deformed. Thus, the first cover 30 and the second cover 40 move away from each other, and the opening 22 of the bezel 20 is open for extension of the tray 12 out of the bezel 20. The first cover 30 turns down via partial rebounding of the elastic members 50. The engaging portions 324 of the first cover 30 cooperate with the engaging portions 424 of the second cover 40 and turn the second cover 40 up and cause a top of the stressed member 44 to support a bottom of the tray 12.

The switch 14 of the data storage device 10 is triggered by the button assembly 26 when it is desired to cause the tray 12 to retract. The tray 12 retracts and presses the second guiding portion 446 of the stressed member 44 and drives the second cover 40 to turn down. The engaging portions 424 of the second cover 40 cooperate with the engaging portions 324 of the first cover 30. The elastic members 50 are deformed again. The first cover 30 turns up around the first rods 23. Thus, the first cover 30 and the second cover 40 move away from each other, and the opening 22 of the bezel 20 is open for retraction of the tray 12. After the tray 12 retracts, the first cover 30 turns down via the elastic members 50. The engaging portions 324 of the first cover 30 cooperate with the engaging portions 424 of the second cover 40 to turn the second cover 40 up. So that the first cover 30 and the second cover 40 move toward each other to cover the opening 22 of the bezel 20.

The shape edge 36 of the first cover 30 is engaged in the slot 48 of the second cover 40 to cover the opening 22 of the bezel 20. The locating posts 27 are engaged in the corresponding arc-shaped first cutouts 34 of the first cover 30 and the arc-shaped second cutouts 46 of the second cover 40 for locating the first cover 30 and the second cover 40.

Figure 7:
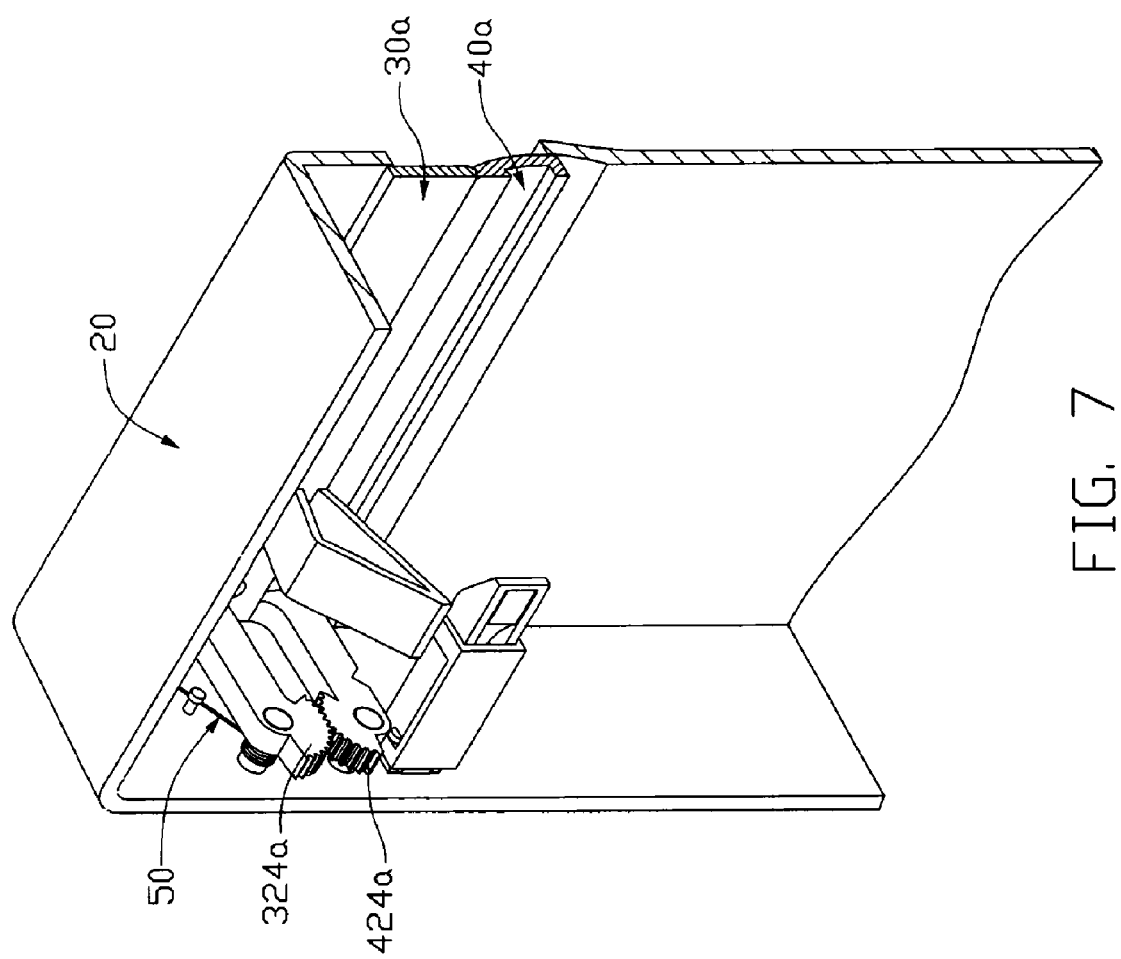
FIG. 7 is an isometric view of a cover mechanism in accordance with a second preferred embodiment of the present invention, but partially cutaway.

Referring to FIG. 7, a cover mechanism of an electronic device in accordance with a second preferred embodiment of the present invention is shown. The main differences between the second preferred embodiment and the first preferred embodiment are: the engaging portions 322 of the first cover 30 are substituted by two first crescent shaped gears 324a with a plurality of teeth, and the engaging portions 424 of the second cover 40 are substituted by two second crescent shaped gears 424a with a plurality of teeth. The first crescent shaped gears 324a and the second crescent shaped gears 424a engage with each other to move the first cover 30 and the second cover 40 correspondingly for uncovering or covering the opening 22 of the bezel 20.

Figure 8:
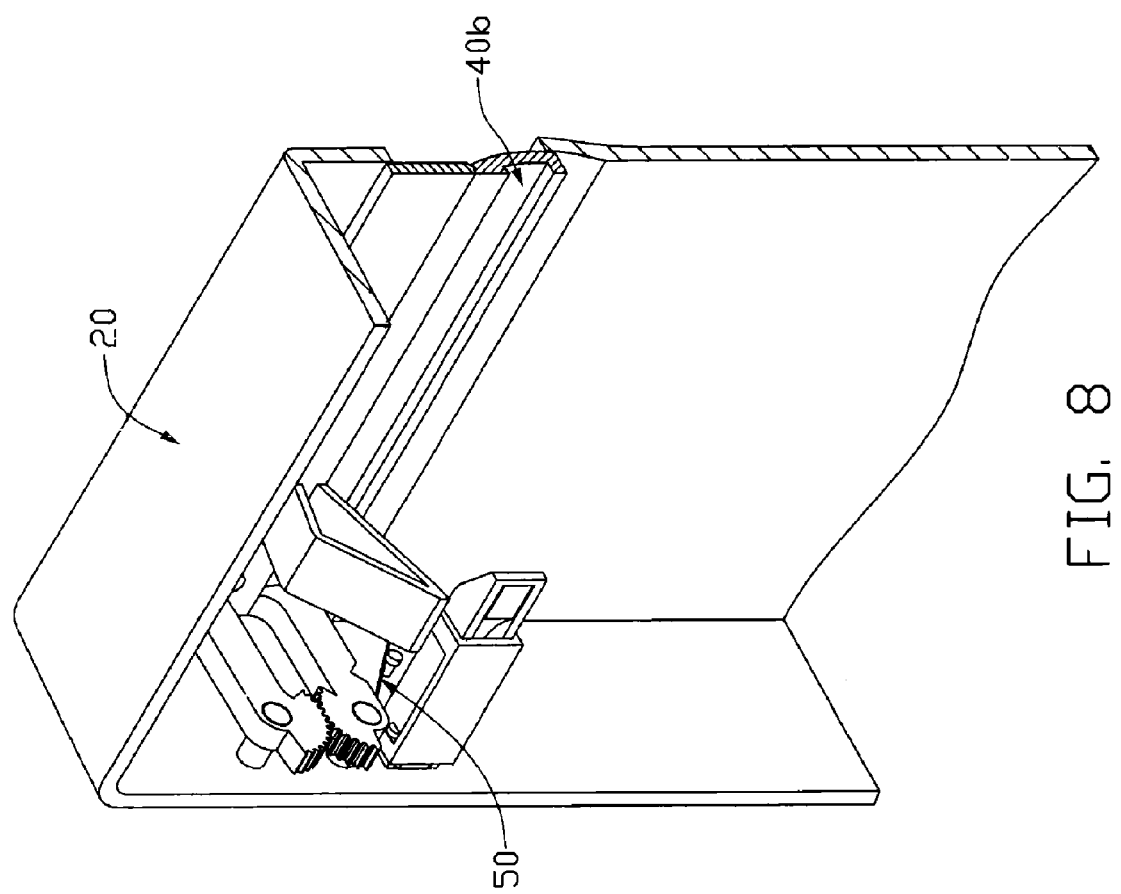
FIG. 8 is an isometric view of a cover mechanism in accordance with a third preferred embodiment of the present invention, but partially cutaway.

Referring to FIG. 8, a cover mechanism of an electronic device in accordance with a third preferred embodiment of the present invention is shown. In the comparing third preferred embodiment with the second preferred embodiment, the elastic members 50 are instead placed between the second cover 40b and the bezel 20.

It is believed that the present embodiments and their advantages will be understood from the foregoing description, and they will be apparent that various changes may be made thereto without departing from the spirit and scope of the invention or sacrificing all of its material advantages, the examples hereinbefore described merely being preferred or exemplary embodiments.

What is claimed is:

1. A cover mechanism for protecting a data storage device installed in an electronic device, the data storage device having a tray, the cover mechanism comprising:
   a bezel defining an opening for the tray passing therethrough;
   a first cover movably connected to the bezel, the first cover comprising a first body covering one part of the opening of the bezel;
   a second cover movably connected to the bezel, the second cover comprising a second body covering the other part of the opening of the bezel;
   an elastic member mounted between one of the first and second covers and the bezel; and
   wherein the first cover and the second cover is capable of cooperating to move away from each other to uncover the opening of the bezel when the tray of the data storage device extends out of the opening, and moving toward each other via rebounding of the elastic member for covering the opening of the bezel.

2. The cover mechanism as claimed in claim 1, wherein the second cover comprises a stressed member for the tray of the data storage device acting thereon to turn the second cover.

3. The cover mechanism as claimed in claim 2, wherein the stressed member comprises a first guiding portion slantingly extending up and forward for the tray sliding thereon when the tray extends out of the data storage device, and a second guiding portion slantingly extending down and forward for the tray sliding thereon when the tray retracts.

4. The cover mechanism as claimed in claim 1, wherein two first arms protrude from two ends of the first cover for pivotably mounting the first cover to the bezel, and two second arms protrude from two ends of the second cover for pivotably mounting the second cover to the bezel.

5. The cover mechanism as claimed in claim 4, wherein the bezel comprises two side panels, each of the side panels comprises a first rod and a second rod, each of the first arms of the first cover defines a first pivoting hole for fitting about the corresponding first rod, and each of the second arms of the second cover defines a second pivoting hole for fitting about the corresponding second rod.

6. The cover mechanism as claimed in claim 4, wherein a first engaging portion protrudes from each of the first arms of the first cover, a second engaging portion protrudes from each of the second arms of the second cover for engaging with the corresponding first engaging portion.

7. The cover mechanism as claimed in claim 4, wherein a first crescent shaped gear is formed from each of the first arms of the first cover, a second crescent shaped gear is formed from each of the second arms of the second cover for engaging with the corresponding first gear.

8. The cover mechanism as claimed in claim 1, wherein the elastic member is a torsion spring.

9. The cover mechanism as claimed in claim 1, wherein a slot is defined in a top of the second cover, and a shape edge is formed from a bottom of the first cover for engaging in the slot.

10. The cover mechanism as claimed in claim 1, wherein a first cutout is defined in the first cover, and a second cutout is defined in the second cover relative to the first cutout, a locating post is formed on an inner surface of the bezel for engaging in the first cutout and the second cutout for locating the first cover and the second cover.

11. A cover mechanism for protecting a data storage device installed in an electronic device, the data storage device having a tray, the cover mechanism comprising:
- a bezel defining an opening for the tray passing therethrough;
- a first cover movably connected to the bezel;
- a second cover movably connected to the bezel and cooperating with the first cover; and
- an elastic member mounted between the bezel and one of the first cover and the second cover;
- wherein the first cover and the second cover cooperate to move away from each other via the tray of the data storage device acting on one of the first and second covers for uncovering the opening of the bezel, and move toward each other via rebounding of the elastic member for covering the opening of the bezel.

12. The cover mechanism as claimed in claim 11, wherein the second cover comprises a stressed member for the tray of the data storage device acting thereon to turn the second cover.

13. The cover mechanism as claimed in claim 11, wherein two first arms protrude from two ends of the first cover for pivotably mounting the first cover to the bezel, and two second arms protrude from two ends of the second cover for pivotably mounting the second cover to the bezel.

14. The cover mechanism as claimed in claim 13, wherein the bezel comprises two side panels, each of the side panels comprises a first rod and a second rod, each of the first arms of the first cover defines a first pivoting hole for fitting about the corresponding first rod, and each of the second arms of the second cover defines a second pivoting hole for fitting about the corresponding second rod.

15. The cover mechanism as claimed in claim 13, wherein each of the first arms of the first cover forms a plurality of teeth, and each of the second arms of the second cover forms a plurality of teeth for engaging with the corresponding teeth of the first cover.

16. The cover mechanism as claimed in claim 15, wherein the elastic member is mounted between the bezel and the second cover.

17. A combination comprising:
- a case comprising a bezel defining an opening;
- a data storage device mounted within the case and having a tray being moveable between a close position and an open position via the opening of the bezel; and
- a pair of covers pivotably attached the case for cooperating to cover the opening when the tray is at the close position; wherein
- the covers are capable of pivoting away from each other to uncover the opening when the tray moves from the close position to the open position and acts on one of the covers, and
- pivoting toward each other to cover the opening when the tray moves from the open position to the close position.

18. The combination as claimed in claim 17, further comprising an elastic member mounted between the case and the covers and configured for driving the covers to move from the open position to the close position.

19. The combination as claimed in claim 17, wherein a pair of engaging portions is formed between the covers and configured for transmitting movement from one of the covers to the other of the covers.

20. The combination as claimed in claim 17, wherein one of the covers defines an elongated slot, and the other of the covers forms an elongated shape edge fitting in the slot when the tray is at the close position.

* * * * *